UNITED STATES PATENT OFFICE.

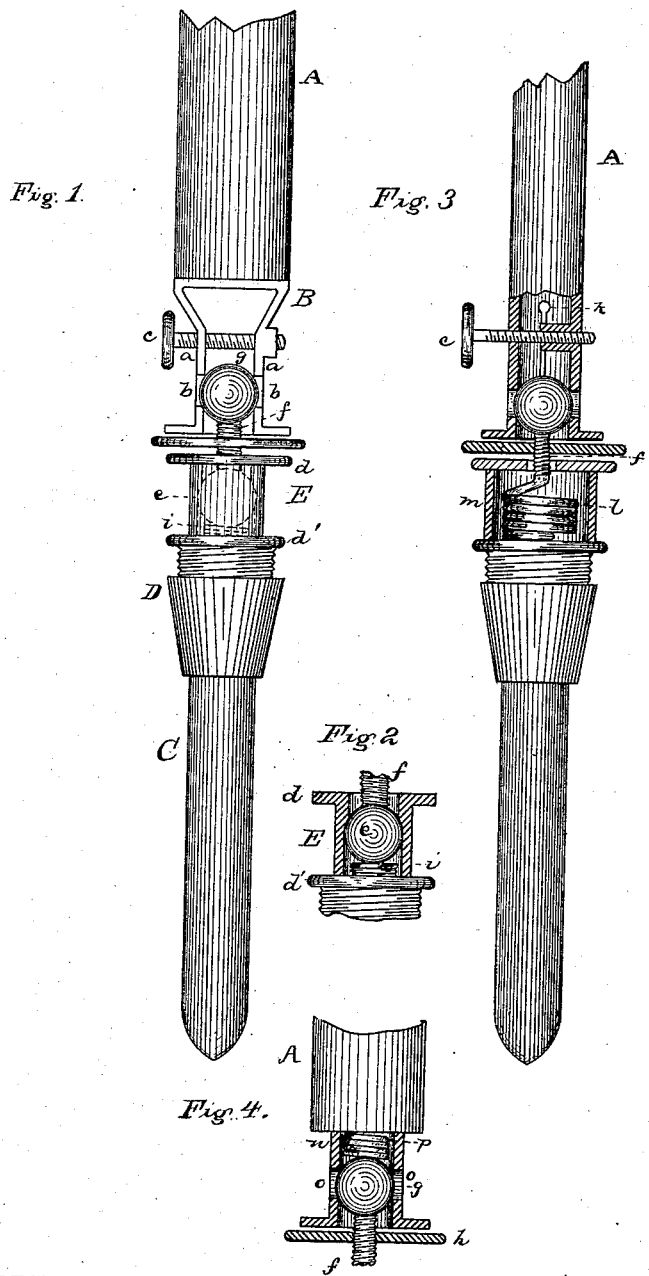

OTTO A. MOSES, OF NEW YORK, N. Y.

VOLTAIC-ARC LAMP.

SPECIFICATION forming part of Letters Patent No. 286,953, dated October 16, 1883.

Application filed February 17, 1883. (No model.)

*To all whom it may concern:*

Be it known that I, OTTO A. MOSES, of New York city, in the county and State of New York, have invented a certain new and useful Improvement in Voltaic-Arc Lamps, (Case H,) of which the following is a specification.

The object of this invention is to render the light of the voltaic arc more steady and constant, preventing, to a great extent, the unpleasant changes and fluctuations which have hitherto been found unavoidable. Such unsteadiness is produced, mainly, by the slowness of the action of the regulating mechanism, which is never able to act instantaneously, so that their inertia often causes the carbons to approach each other too closely before such mechanism has time to separate them. Also, as all carbons are more or less crooked or bent, they are consumed unevenly, and the points of two carbons do not remain directly opposite each other, the resistance of the arc, therefore, constantly varying.

I remedy the above defects by attaching the movable carbon to its carbon-carrier through a loose or pivoted connection instead of rigidly, as has heretofore been the practice, so that such carbon will be suspended vertically and with its axis of suspension passing through its center of gravity, so that there will be as much carbon on one side of the axis as on the other. The loose connection allows a slight movement of the carbon either in a lateral or in an upward direction, and when the carbons approach each other too closely, before the regulating mechanism has time to act, the mechanical force of the arc will push the carbon back or to one side, and thus maintain the normal length and resistance of the arc.

My invention is illustrated in the annexed drawings, in which Figure 1 is a view in elevation, illustrating the preferred manner of suspending the upper carbon; Fig. 2, a sectional view of the pivoted connection of Fig. 1; and Figs. 3 and 4 are views, partly in section and partly in elevation, of modifications of the preferred form.

Referring to Figs. 1 and 2, A represents a carbon-carrying tube, to the lower end of which is attached an open clamp, B, consisting of two metal sides, $a\ a$, each having a slot, $b$. A screw, $c$, is provided for bringing the two sides of the clamp together.

C is the upper carbon, set in a suitable holder, D. Above such holder is attached the socket, consisting of a cylinder, E, having flanges $d\ d'$, its interior being formed to receive and hold the ball $e$. From said ball $e$ a screw-threaded rod, $f$, extends upwardly, and is attached to ball $g$, the aperture in the top of cylinder E being larger than rod $f$. A circular disk, $h$, is placed upon rod $f$, between flange $d$ and clamp B.

When a carbon is to be put in place, the screw $c$ is loosened and the ball $g$ is withdrawn from the clamp. The carbon is then placed in the holder and ball $g$ thrust back into the clamp, its sides entering the slots $b$, the disk $h$ being screwed down tightly upon flange $d$, so that a rigid joint is formed by ball $e$ and socket E. The position of the ball $g$ is then adjusted until the carbon hangs vertically, with just as much carbon on one side of the axis of suspension as on the other, and with its point in line with that of the lower carbon. The screw $c$ is then tightened until the ball $g$ is held rigidly by the clamp. Then, by screwing up the disk $h$, the ball-and-socket joint E $e$ is loosened, and the carbon is suspended freely from this point. The disk $h$ may be so placed as to allow any desired extent of lateral movement of the carbon. A spiral spring, $i$, is placed between ball $e$ and the bottom of socket E, to assist in conveying the current to the carbon, and to allow an upward movement of the latter. The carbon can thus move slightly in any direction, so that when sudden shortenings of the space between the carbons occur, by reason of irregularities in the action of the mechanism or in the shape of the carbon, the mechanical force of the arc throws the carbon up or to one side or the other, whereby the normal length of the arc is maintained until the regulating mechanism has time to act, and by raising the carbon allow it to hang vertically again.

In the form shown in Fig. 3, instead of the clamp B, the lower end of the tube A is split, as shown at $k$, the screw $c$ holding the parts together. The screw-threaded rod $f$, attached to ball $g$, terminates in a spiral spring, $l$, placed in a suitable cage, M. The operation is the same as in Fig. 1, the position of disk $h$ determining the freedom of movement of the spring $l$.

A very simple construction is illustrated in Fig. 4. A small tube, $n$, extends below the carbon-carrying tube A. Within this tube is placed the ball $g$, held by the apertures $o\ o$, a spiral spring, $p$, being used to make good contact for conveying the current. The rod $f$ is attached directly to the carbon-holder, the loose suspension being from the ball $g$, and the extent of movement being decreased or increased by screwing the disk $h$ up or down.

In all these forms the small area of the rod $f$ prevents the conduction of much heat from the arc to the carbon-carrying tube and the regulating mechanism.

What I claim is—

1. In a voltaic-arc lamp, the upper carbon, suspended loosely, substantially as set forth.

2. In a voltaic-arc lamp, the upper-carbon holder, provided with means for suspending it, which means allow the lateral and vertical movement of the carbon, substantially as set forth.

3. In a voltaic-arc lamp, the upper-carbon holder, suspended from the carbon-carrier through a ball-and-socket joint, which allows a lateral movement of the carbon, substantially as set forth.

4. In a voltaic-arc lamp, the combination, with the ball-and-socket joint permitting the lateral movement of the upper carbon, of a spring permitting a vertical movement thereof, substantially as set forth.

5. In a voltaic-arc lamp, the combination, with the upper-carbon holder, of two suspending devices therefor, one loose, the other rigid, and both adjustable, substantially as set forth.

6. The combination, with the carbon-holder and the carbon-carrying tube, of the two connected balls, one held rigidly and adjustably, the other loosely, substantially as set forth.

7. The combination, with the device for loosely suspending the upper carbon, of means for adjusting the extent of movement allowed by said device, substantially as set forth.

8. The combination, with the ball or spring forming the loose suspending-joint, the rod attached thereto, and the socket or chamber inclosing said ball or spring, of the disk mounted on said rod, whose position thereon determines the movement of said ball or spring, substantially as set forth.

This specification signed and witnessed this 5th day of February, 1883.

OTTO A. MOSES.

Witnesses:
H. W. SEELY,
EDWARD H. PYATT.